N. H. NORRIS.
CENTERING DEVICE FOR CREAM SEPARATOR BOWLS.
APPLICATION FILED OCT. 3, 1919.
1,361,283. Patented Dec. 7, 1920.
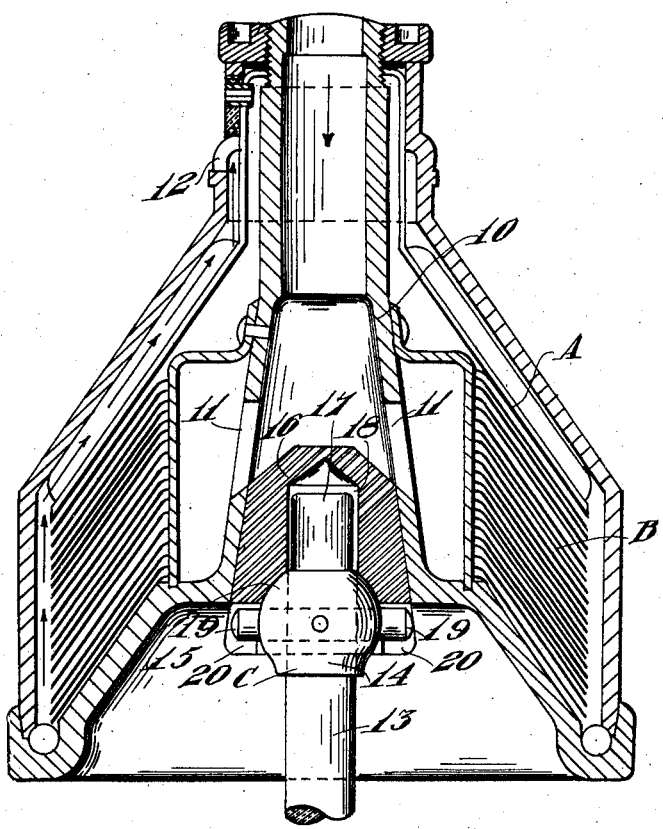
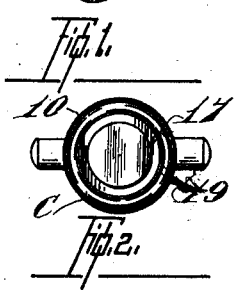
INVENTOR
NELSON H. NORRIS
BY
ATTY'S.

UNITED STATES PATENT OFFICE.

NELSON HOWARD NORRIS, OF RENFREW, ONTARIO, CANADA.

CENTERING DEVICE FOR CREAM-SEPARATOR BOWLS.

1,361,283.

Specification of Letters Patent.   Patented Dec. 7, 1920.

Application filed October 3, 1919.  Serial No. 328,308.

*To all whom it may concern:*

Be it known that I, NELSON HOWARD NORRIS, a subject of the King of Great Britain, and resident of the town of Renfrew, in the Province of Ontario, Dominion of Canada, have invented certain new and useful Improvements in Centering Devices for Cream-Separator Bowls, of which the following is a specification.

This invention relates to improvements in centering devices for cream separator bowls, and particularly to that type of bowl which is mounted loosely on a ball spindle and is what is known as a self-centering bowl, and the objects of the invention are to provide a simple and effective means of steadying the bowl when not rotating at a high rate of speed, the bowl being adapted automatically to find its own center of gravity and balance when rotating at a high rate of speed.

It is commonly known that self-centering bowls of this type have a tendency to wabble when first rotated, or when turned at a low velocity, thereby causing an irregular action until such times as the bowl has obtained sufficient velocity to cause it to center itself. This wabbling is liable to displace the tinware placed around the bowl, and known as milk and cream spouts.

According to the present invention this difficulty is overcome by providing a projecting guide member adapted to fit closely but not tightly to a recess provided in the thimble extending between a ball and the bowl, all constructed and arranged as shown in detail in the accompanying specification and drawings.

In the drawings:

Figure 1 is a sectional elevation of an embodiment of the invention.

Fig. 2 is a plan view of the ball spindle.

In the drawings like characters of reference indicate corresponding parts in all the figures.

Referring to the drawings, A represents a cream separator bowl of any well known type, containing nested separating disks B, and a tubular center member 10 which has outlet ports 11 for the milk, the skimmed milk passing out from the bowl through the ports 12. C represents the ball spindle which ordinarily supports the bowl A, comprising a spindle portion 13 and a ball portion 14, the ball portion being adapted to fit a corresponding socket 15 provided in the thimble 16 which fits the lower end of the tubular member 10. In accordance with the present invention the top of the ball is provided with a projecting guide member or pin 17 which fits loosely in a socket 18 in the thimble. The ball 14 is prevented from turning with respect to the thimble by means of a plurality of rotary projecting pins 19 which extend in slots or recesses 20 on the thimble.

The other details of the cream separator (not shown) will be constructed in the usual way according to any approved design; the method of operation will be understood by those skilled in the art.

It will be seen that since the pin 17 fits closely, but not tightly to the sockets 18, it will be possible for the bowl to move laterally on the socket a distance equal to the amount of space between the steadying member 17 and the socket and will not be able to wabble to the large extent that would be possible if the steadying member were not provided on top of the ball spindle. Of course when a sufficient speed is obtained the bowl will automatically center itself.

As many changes could be made in the above construction and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is;

In a cream separator, the combination with a bowl and a ball spindle supporting the same, of a socket having an arcuate recess engaging with the ball and provided with a socket in axial alinement with the bowl, and a steadying member extending from the ball in axial alinement with the spindle and designed to enter the socket but terminate clear of the end of the socket permitting the bowl to swivel on the ball.

In witness whereof I have hereunto set my hand.

NELSON HOWARD NORRIS.